(12) United States Patent
Roth

(10) Patent No.: US 12,061,948 B2
(45) Date of Patent: Aug. 13, 2024

(54) KIT FOR FORMING A RADIO FREQUENCY SIGNAL ISOLATING CONTAINER

(71) Applicant: Avery Dennison Retail Information Services LLC, Mentor, OH (US)

(72) Inventor: Mark Roth, North Miami, FL (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 131 days.

(21) Appl. No.: 17/778,534

(22) PCT Filed: Dec. 12, 2020

(86) PCT No.: PCT/US2020/064714
§ 371 (c)(1),
(2) Date: May 20, 2022

(87) PCT Pub. No.: WO2021/119558
PCT Pub. Date: Jun. 17, 2021

(65) Prior Publication Data
US 2022/0414356 A1   Dec. 29, 2022

Related U.S. Application Data

(60) Provisional application No. 62/947,224, filed on Dec. 12, 2019.

(51) Int. Cl.
*G06K 7/10* (2006.01)

(52) U.S. Cl.
CPC ..... *G06K 7/10277* (2013.01); *G06K 7/10445* (2013.01)

(58) Field of Classification Search
CPC ............... G06K 7/10277; G06K 7/10445
USPC ....................................... 340/572.8
See application file for complete search history.

(56) References Cited

U.S. PATENT DOCUMENTS

| | | | |
|---|---|---|---|
| 8,079,132 B2 | 12/2011 | Clayman | |
| 9,526,333 B1* | 12/2016 | Nielson | A47B 87/0292 |
| 10,482,292 B2* | 11/2019 | Clouser | G06K 7/10009 |
| 2006/0187055 A1 | 8/2006 | Colby | |
| 2006/0283945 A1 | 12/2006 | Excoffier et al. | |
| 2009/0055278 A1* | 2/2009 | Nemani | G06Q 20/204 |
| | | | 235/383 |
| 2013/0342320 A1 | 12/2013 | Hinman et al. | |
| 2016/0117530 A1 | 4/2016 | Roth | |
| 2017/0003333 A1* | 1/2017 | Ronkainen | H01Q 1/10 |
| 2017/0228569 A1 | 8/2017 | Mardkha | |
| 2017/0286903 A1* | 10/2017 | Elizondo, II | G06K 7/1413 |

(Continued)

OTHER PUBLICATIONS

International Search Report and Written Opinion dated Mar. 24, 2021 issued in corresponding IA No. PCT/US2020/064714 filed Dec. 12, 2020.

(Continued)

*Primary Examiner* — Kerri L McNally

(57) ABSTRACT

Some embodiments include a kit for forming a radio frequency container. The kit may include a top panel, a bottom panel having a raised support, at least one side panel configured to connect the top panel and the bottom panel, and an RF antenna configured for attachment to an interior surface of the container. The top panel, the bottom panel, and the at least one side panel may be configured to reflect and contain RF signals within the radio frequency container.

16 Claims, 13 Drawing Sheets

(56) References Cited

U.S. PATENT DOCUMENTS

2019/0090390 A1\* 3/2019 Judy ................ A45C 3/001
2019/0228193 A1   7/2019 Roth

OTHER PUBLICATIONS

International Preliminary Report on Patentability dated May 17, 2022 issued in corresponding IA No. PCT/US2020/064714 filed Dec. 12, 2020.

\* cited by examiner

KIT FOR FORMING A RADIO FREQUENCY SIGNAL ISOLATING CONTAINER

CROSS-REFERENCE TO RELATED APPLICATION

The present application is a 371 of International Application No. PCT/US2020/064714, which was published in English on Jun. 17, 2021, and claims the benefit of U.S. Provisional Patent Application No. 62/947,224 filed Dec. 12, 2019, both of which are incorporated herein by reference in their entireties.

BACKGROUND

Many source factories supplying goods to retailers have been required to comply with the implementation of various forms of RFID-based labeling and tagging. However, these source factories typically lack the guidance and means to conduct audits and verification of the RFID-tagged items. In essence, retailers have been issuing compliance mandates to source factories, yet leaving the execution of successfully accomplishing these mandates to the factories themselves.

Such mandates may describe the type of RFID inlay to be used, the layout of the human-readable information, the size of the tag or label, and the placement of the tag or label on the items. However, these mandates do not describe preferred methods of verification of pack quantities and how, or if, the RFID transponders themselves are operational.

Traditionally, the audit of packing of non-RFID-tagged items has been conducted by hand count. These hand count methods have carried over despite a more efficient means of performing tabulation of goods being implemented. Moreover, as no automated means of verification has been outlined, many locations simply continue the hand count process on select cartons. As a result, only a small percentage of cartons is able to be checked for packing accuracy.

In contrast, RFID provides a non-contact means of conducting audits on cartons to be shipped to retailers. Some factories have attempted to implement the use of handheld RFID scanning devices, but handheld RFID scanners may also sometimes read RFID-tagged goods nearby, resulting in inaccurate data collection. Some conventional RFID tunnels may help provide signal isolation, but such systems may be large, difficult to ship, and/or higher cost. Accordingly, improvements over such conventional systems may still be needed.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

Some embodiments include a kit for forming a radio frequency container. The kit may include a top panel, a bottom panel having a raised support, at least one side panel configured to connect the top panel and the bottom panel, and an RF antenna configured for attachment to an interior surface of the container. The top panel, the bottom panel, and the at least one side panel may be configured to reflect and contain RF signals within the radio frequency container.

The bottom panel may be formed with an internal support that RF signals can pass through. The kit may further include a closed end panel, an open end panel that defines an opening, and a covering configured to close the opening and to block RF signals. The antenna may be adapted to interact with an RFID reader external to the container and to emit an RF signal within the interior cavity of the container. The container may be sized to receive a plurality of RFID-tagged items within the interior cavity. The plurality of RFID-tagged items may be densely packed within a carton. The kit may also include four angles for coupling the top panel and bottom panel to the pair of side panels.

The covering may be formed from an RF-blocking fabric. The covering may be formed from a polymer sheet impregnated with RF-blocking substances. The panels may be formed from a wood fiber product conducive to propagation of RF signals. The kit may be adapted to be transported as a flat pack. The kit may further include four angles for coupling the panels. The covering may be formed from an RF-blocking fabric. The covering may be formed from a polymer sheet impregnated with RF-blocking substances.

Some embodiments include a method of forming a kit for forming a radio frequency container. The method may include providing a top panel, providing a bottom panel having a raised support, providing at least one side panel configured to connect the top panel and the bottom panel, providing an RF antenna configured for attachment to an interior surface of the container. The top panel, the bottom panel, and the at least one side panel may be configured to reflect and contain RF signals within the radio frequency container.

The bottom panel may be formed with an internal support that RF signals can pass through. The method may further include providing a closed end panel, providing an open end panel that defines an opening, and providing a covering configured to close the opening and to block RF signals. The antenna may be adapted to interact with an RFID reader external to the container and to emit an RF signal within the interior cavity of the container. The container may be sized to receive a plurality of RFID-tagged items within the interior cavity. The plurality of RFID-tagged items may be densely packed within a carton.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE FIGURES

Advantages of embodiments of the present invention will be apparent from the following detailed description of the exemplary embodiments. The following detailed description should be considered in conjunction with the accompanying figures in which.

DETAILED DESCRIPTION

Aspects of the invention are disclosed in the following description and related drawings directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Figure 1:
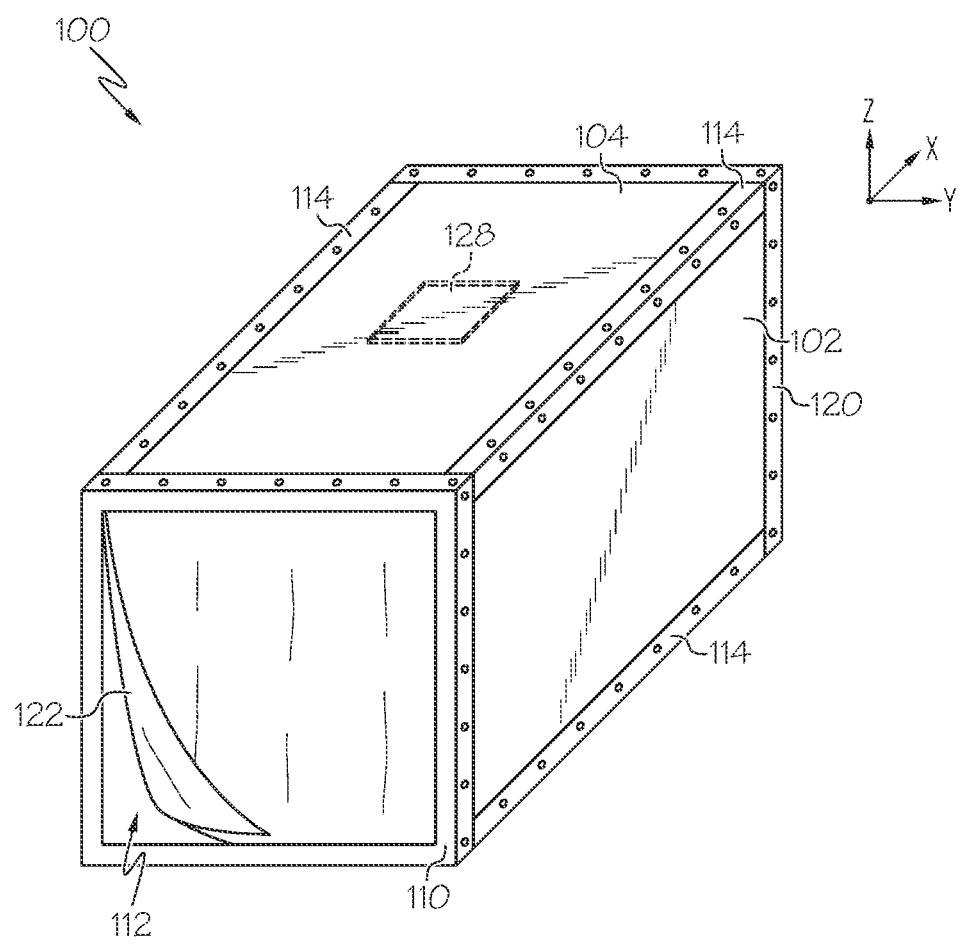
FIG. 1 is a perspective view of a radio frequency signal isolating container, in accordance with some embodiments.
Figure 2:
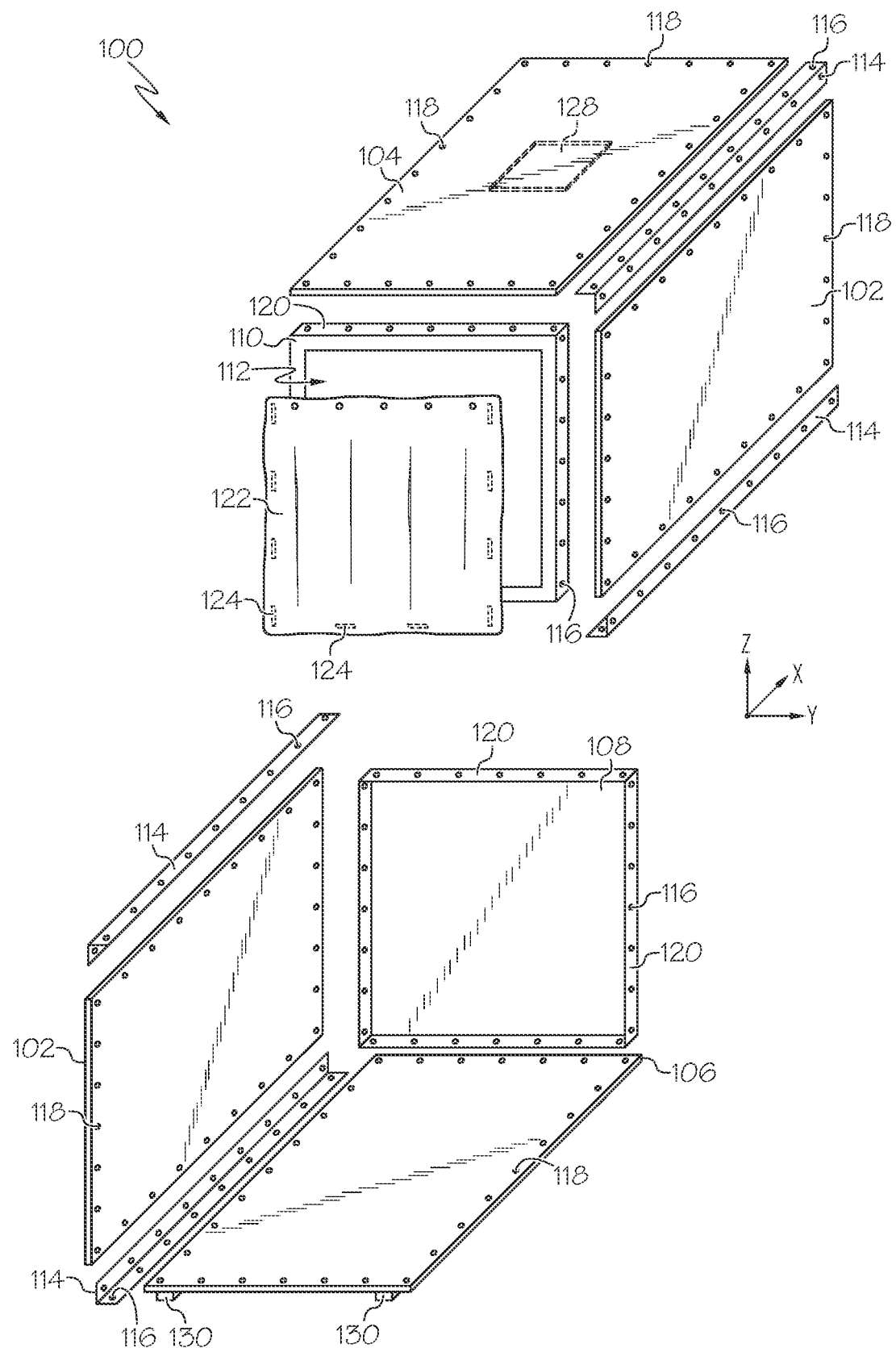
FIG. 2 is an exploded perspective view of a radio frequency signal isolating container, in accordance with some embodiments.
Figure 3:
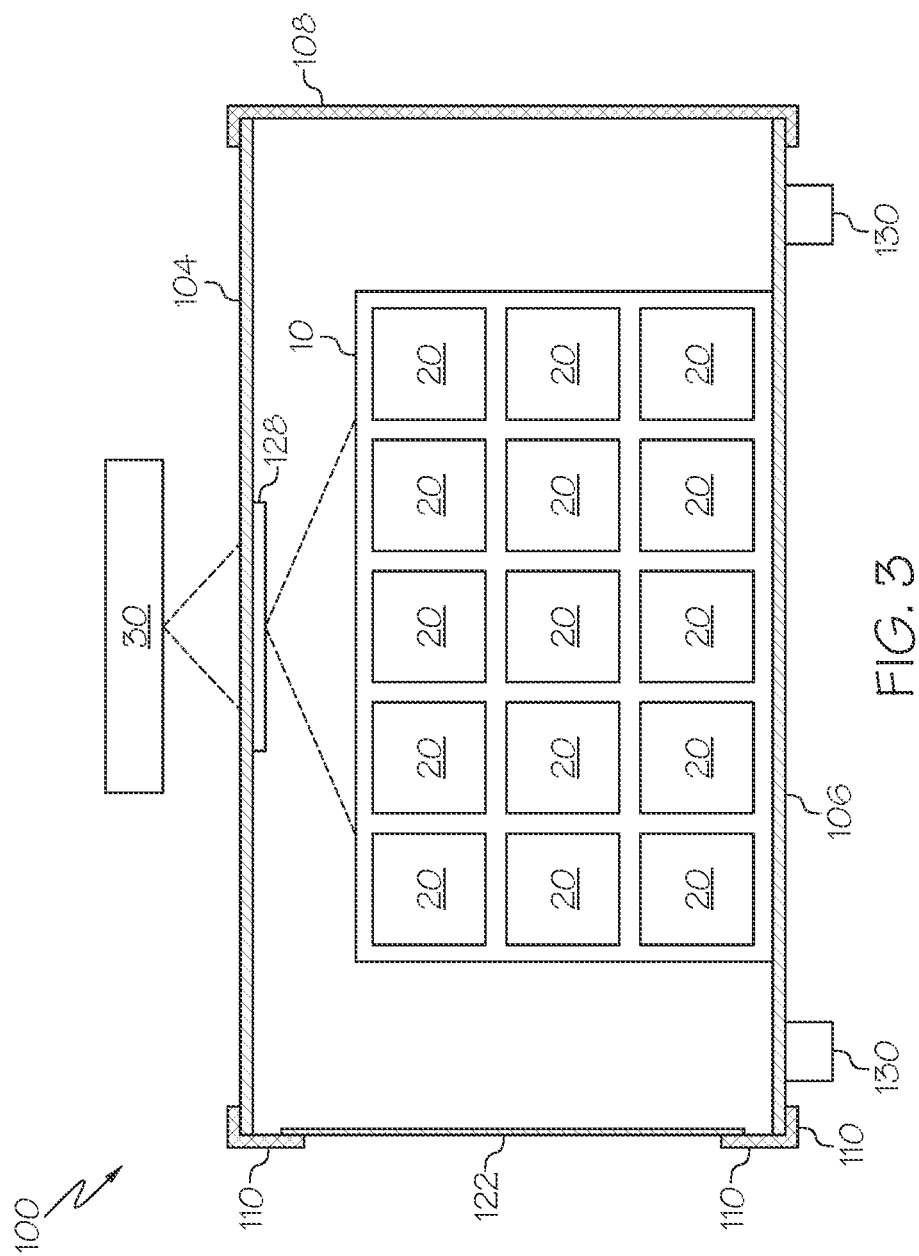
FIG. 3 is a cross-sectional view of a radio frequency signal isolating container, in accordance with some embodiments.

According to various embodiments, and as shown in in FIGS. 1-3, a radio frequency signal isolating container 100 is disclosed. Container 100 may be sized and shaped to enclose a carton containing a plurality of RFID-tagged items, and can provide the RFID isolation necessary to perform effective individual carton RFID readings on all items within the carton.

Container 100 may be adapted for ease of shipment and assembly, as well as for low cost. To that end, container 100 may be provided as a kit that may be shipped in a compact configuration, for example as a flat pack carton, such that multiple kit units may be shipped on a single pallet. The container as assembled is shown in FIG. 1, while the constituent components of container 100 are shown in the exploded view of FIG. 2.

Container 100 may be shaped as a rectangular prism and can include two or more side panels 102, a top panel 104, and a bottom panel 106. Container 100 may further include one or more of a closed end panel 108 and/or an open end panel 110 having an opening 112 defined therethrough. Four angles 114, which may extend the length of the top, bottom, and/or side panels can be used to couple components such as the top panel 104 or bottom panel 106 to one or more side panels 102. Angles 114 may be made partially or entirely out of metal, and may be coated or plated with metal to help protect against emission or reception of RF signals into or out of the container 100.

In various embodiments, one or more of the closed end panel 108 and open end panel 110 may be formed with one or more flanges 120 extending away from an internal side of the closed end panel 108 and open end panel 110 along an axis defining a plane of an outer surface of the closed end panel 108 and open end panel 110. The flanges 120 may extend from a side or from an internal surface of the closed end panel 108 or open end panel 110. For example, in FIG. 2, four flanges 120 may extend from the sides of each of the closed end panel 108 and the open end panel 110 along the X-axis direction, which may also define a plane of an outer surface of each of the closed end panel 108 and the open end panel 110. The flanges 120 may provide a surface for attaching one or more of the side panels 102, the top panel 104, and the bottom panel 106 to one or more of the closed end panel 108 and the open end panel 110. The flanges 120 may be between 1 and 5 inches long in various embodiments in the X-axis direction of FIG. 2, but may be longer or shorter in other embodiments. The flanges 120 may also operate to cover gaps between the closed end panel 108 and the open end panel 110 and one or more of the side panels 102, the top panel 104, and the bottom panel 106, thus helping to prevent stray signals from entering or leaving the container 100.

In various embodiments, one or more of the angles 114, closed end panel 108, open end panel 110, top panel 104, bottom panel 106, and side panel(s) 102 can have a plurality of apertures 116 defined therethrough and/or fastener receivers 118. Coupling and/or aperture locations may correspond to coupling and/or aperture locations on corresponding mating parts.

In various embodiments, fasteners, such as bolts, screws, cam screws, zip ties, knob bolts, eye bolts, screws, and/or threaded shanks (not shown) can be inserted through the various apertures 116 and into fastener receivers 118 (or vice versa) to easily assemble container 100 from its constituent parts. Fastener receivers may include weld nuts, wing nuts, long nuts, square nuts, hexagon slotted nuts, and/or cam lock nuts. In further exemplary embodiments, other methods and devices for assembling container 100 that requires minimal or no tools may be contemplated and provided as described.

In various embodiments, the opening 112 of open end panel 110 may be provided with a radio-frequency-blocking covering 122. Covering 122 may be provided, for example, as a curtain for ease of ingress and egress from the interior cavity of container 100. A portion of covering 122 may be coupled to panel 110 by fasteners such as screws, nails, zip ties, bolts or other connectors. Covering 122 can also include detachable closures 124 disposed on the edges thereof to allow attaching and detaching covering 122 from open end panel 110, which can include complementary closures disposed thereon at locations corresponding to closures 124. In some exemplary embodiments, closures 124 may include magnets, and complementary magnets may be provided on front end panel 110 or front panel 110 that are formed from a ferromagnetic material. In other exemplary embodiments, closures 124 may be hook-and-loop fasteners, zippers, buttons, or any other type of easily detachable fastener that allows container 100 to function as described herein.

In various embodiments, covering 122 may be formed from a RF-blocking fabric or may be a polymer sheet, for example a polyurethane sheet, that is impregnated and/or coated with RF-blocking and/or reflective substances such as metal or foil. In other embodiments, covering 122 may include blinds that are made from wholly or in part with metal and/or are coated with metal. In some embodiments, the covering 122 may be folded, bent, rotated, or disengaged from the container 100 in order to open or close the opening 112. In some embodiments, the covering 122 may be deformable to allow bending of the covering 122 after which it may recover its shape. In some embodiments, the covering 122 may be stiff, such that it would break, facture, or become plastically deformed before being bent to touch one edge against another.

In various embodiments, one or more of the components of the container 100 such as the angles 114, the closed end panel 108, the open end panel 110, the top panel 104, the bottom panel 106, the side panel(s) 102, and the covering 122 may be formed in whole or in part from one or more of polyurethane, foil, rubber, fabric, wood, metal, cardboard, glass, ceramic, carbon fiber, PVC foam board, medium density fiberboard (MDF), plywood, and/or plastic. Partial formation using one of the materials may include composition of one or more layers forming the structure of the component and/or forming one or more sections of the component.

In various embodiments, an antenna 128 may be located on the interior surface of top panel 104. Antenna 128 may be a wide beam antenna. The outer surface of bottom panel 106 may be provided with raised supports 130 for elevating bottom panel 106 to prevent deactivation of an RFID device in proximity to the bottom panel 106 if there is insufficient air gap below the bottom panel 106 (e.g., on an opposite side of the bottom panel 106 from the RFID device). In some embodiments, the raised supports 130 allow the RFID interrogation signal to propagate from under the carton 10.

In some embodiments, one or more of the side panels 102, the top panel 104, and the bottom panel 106 may be formed from a wood fiber product that is conducive to the propagation of RF signals. In some embodiments, the configuration and/or materials of the side panels 102, the top panel 104, and/or the bottom panels 106, the covering 122, and/or the raised supports 130 that elevate the bottom panel 106, provide an enclosure that can fully contain an RF signal to the interior cavity of container 100 and that can prevent stray reads of RDIF tagged items located outside container 100.

In various embodiments, such as in FIG. 3, a container 100 may hold a carton 10 containing a plurality of RFID-packed items 20. Items 20 may be densely packed in carton 10, such that carton 10 may contain tens, hundreds, or thousands of items 20. An RFID reader 30 disposed outside container 10 may interact wirelessly or through a wired connection with antenna 128 disposed on the inner surface of top panel 106. The resulting RF signal from the antenna 128 may propagate throughout the interior cavity of container 100 and may be fully contained therein, thereby allowing the reader to communicate with all items 20 inside carton 10 without reading any items located outside container 20.

In some embodiments, container 100 may be approximately 36 inches, between 30 and 40 inches, between 20 and 50 inches, between 10 and 60 inches, between 1 and 5 feet, between 3 and 10 feet, between 5 and 30 feet, between 20 and 40 feet, or between 30 and 100 feet in one or more of height, width and length. In some embodiments, one or more of the angles 114, the closed end panel 108, the open end panel 110, the top panel 104, the bottom panel 106, the side panel(s) 102, and the covering 122 have a longest dimension that is approximately 36 inches, between 30 and 40 inches, between 20 and 50 inches, between 10 and 60 inches, between 1 and 5 feet, between 3 and 10 feet, between 5 and 30 feet, between 20 and 40 feet, or between 30 and 100 feet in one or more of height, width and length. In various embodiments, one or more of side panels 102, top panels 104, bottom panels 106, closed end panel 108, and open end panel 110 may have a length and width that are 36", between 30 and 40 inches, between 20 and 50 inches, between 10 and 60 inches, between 1 and 5 feet, and between 3 and 10 feet. In various embodiments, opening 112 may have a size of 30"×30", a length and width between 30 and 40 inches, between 20 and 50 inches, between 10 and 60 inches, between 1 and 5 feet, and between 3 and 10 feet. In various embodiments, angles 114 may have a width and height of 3", between 1 and 5 inches, between 1 and 10 inches, or between 50 and 20 inches. Antenna 128 may have a size of length and width of 6 inches, between 4 and 8 inches, between 1 and 12 inches, or between 1 and 20 inches. However, it should be appreciated that these dimensions are exemplary and not limiting, and differing dimensions, either larger or smaller, for the components of container 100 that allow container 100 to function as described herein may be contemplated and provided as desired.

In some embodiments, container 100 and antenna 128 are agnostic as to the type of RFID reader that is to be used therewith. This may further provide ease of implementation of container 100 and may reduce the cost needed to achieve a widespread deployment of container 100 throughout a facility such as a source factory. While a particular type of reader may be recommended for optimum functionality, container 100 does not preclude the use of various readers that may be more compliant to regional frequency regulations or may have higher availability in a particular region. This provides the purchaser of container 100 with a greater amount of options as to RFID reader platforms.

Figure 4:
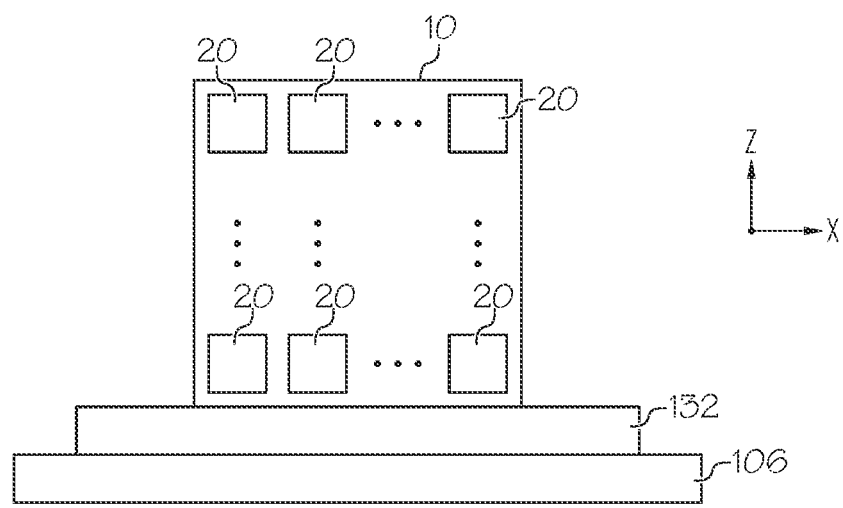
FIG. 4 is a cross-sectional view of components for a radio frequency signal isolating container, in accordance with some embodiments.

FIG. 4 is a cross-sectional view of components for a radio frequency signal isolating container, in accordance with some embodiments. FIG. 4 includes a bottom panel 106, an internal support 132, a carton 10, and multiple containers 20. In various embodiments, the internal support 132 may be formed in whole or in part from one or more of polyurethane, foil, rubber, fabric, wood, metal, cardboard, glass, ceramic, carbon fiber, PVC foam board, medium density fiberboard (MDF), plywood, and/or plastic. In various embodiments, the internal support 132 may be configured to allow RF signals to be communicated between the antenna 128 and one or more RFID tags contained in on or more or all of the containers 20 by reflecting off one or more of a side panel 102, a top panel 103, a bottom panel 106, and by passing through one or more of the internal support 132, the underside of the carton 10, and walls of the containers 20. The internal support 132 may provide space between the bottom panel 106 and the carton 10 to allow communication and reflection of RF signals off of the bottom panel 106 that are entering or exiting the bottom of the carton 10. For embodiments of the internal support 132 that include metal, the internal support 132 may be configured with one or more non-metallic or open areas to permit transmission of incoming and outbound RF signals through the internal support 132. For example, an internal support 132 comprising a metal frame or metal reinforcing bands may still allow transmission of RF signals through the internal support 132.

Figure 5A:
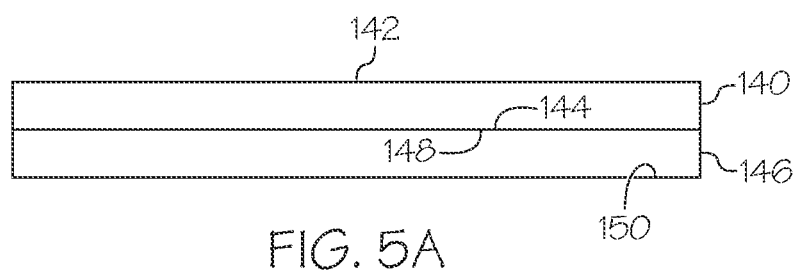
FIGS. 5A and 5B are cross-sectional views of components for a radio frequency signal isolating container, in accordance with some embodiments.
Figure 5B:
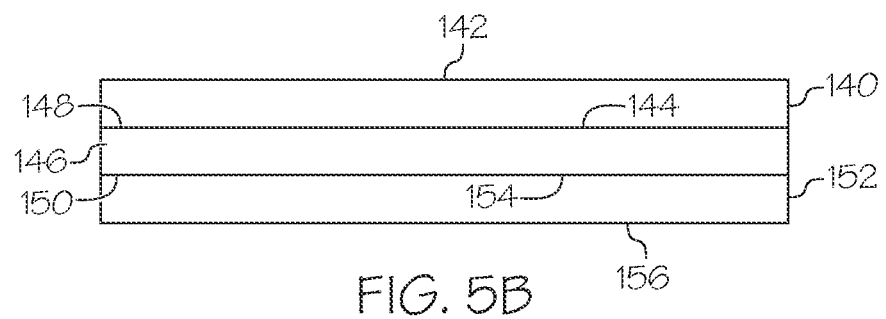

FIGS. 5A and 5B are cross-sectional views of components for a radio frequency signal isolating container, in accordance with some embodiments. FIGS. 5A and 5B include a first layer 140 with a first side 142 and a second side 144 and a second layer 146 with a first side 148 and a second side 150. FIG. 5B further includes a third layer 152 with a first side 154 and a second side 156. In various embodiments, the second side 144 of the first layer 140 contacts the first side 148 of the second layer 146. One or both of the first side 142 of the first layer 140 and the second side 150 of the second layer 146 may be exposed to the interior or the exterior of the container 100, or may be covered by other materials. In some of the embodiments having the third layer 152, the second side 150 of the second layer 146 may contact the first side 154 of the third layer 152. The second side 156 may be exposed to the interior or the exterior of the container 100, or it may be covered by other materials.

The first layer 140, the second layer 146, and/or the third layer 152 may be formed in whole or in part from one or more of polyurethane, foil, rubber, fabric, wood, metal, cardboard, glass, ceramic, carbon fiber, PVC foam board, medium density fiberboard (MDF), plywood, adhesive, and/or plastic.

In various embodiments, one or more of the angles 114, the closed end panel 108, the open end panel 110, the top panel 104, the bottom panel 106, the side panel(s) 102, and the covering 122 may be formed using the combinations of two or more of the first layer 140, the second layer 146, and the third layer 152. In some embodiments, the first layer 140 is composed of metal, and may be formed as a metal plate, grate, mesh, frame, sheet, laminate, film, powder coating, or electroplated layer. The first layer 140 may be configured to act as an RF reflective layer to help isolate the interior of the container 100 from external RF signals, and vice versa, to also help prevent internal RF signals from entering an external environment. In some embodiments, the first layer 140 may be composed of metal to act as a scaffold or support for the second layer 146.

In various embodiments, the second layer 146 may be composed of metal, such as a metallized film, such as a polymer film coated with a thin layer of metal. In other embodiments, the second layer 146 may be a metal sheet such as aluminum foil or a metal plate of thickness between 0.05 and 0.25 inches, between 0.1 and 0.5 inches, or between 0.5 and 1.5 inches. In some embodiments, the second layer 146 is an adhesive layer that bonds the first layer 140 and the third layer 152 together.

In some embodiments, the third layer 152 is a protective coating for a metal layer when formed by the second layer 146. The third layer 152 may be opaque or transparent, and may comprise a plastic sheet or film, wood, rubber, paint, or anodized layer. The protective coating may be used to prevent the metal layer from being damaged through contact with objects and/or through degradation over time through contact with one or more of air, moisture, or other materials. For example, a protective coating may help prevent the metal layer (e.g., a film, an electroplated layer) from being oxidized and/or scratched.

In various embodiments where the first layer 140 acts as the RF reflective structure, the second layer 146 may act as structural support for the first layer 140. In several embodiments for such cases, the second layer 146 may be formed from plywood, particle board, plastic, medium density fiberboard, or foam. In some embodiments, the second layer 146, when made of a stronger or thicker wood material such as plywood, may be used to help support the container 100. In some embodiments, the second layer 146 may be formed from foam, balsa wood, plastic, or other materials sufficient to support a metal layer such as a powder coat, an electroplated layer, or a metallized film. For example, in some embodiments, one or more of the angles 114, the closed end panel 108, the open end panel 110, the top panel 104, the bottom panel 106, the side panel(s) 102, and the covering 122 may be formed using a combination of two or more the first layer 140, the second layer 146, and the third layer 152 to act as a barrier for RF signal transmission. In various embodiments, one or more of the angles 114, the closed end panel 108, the open end panel 110, the top panel 104, the bottom panel 106, the side panel(s) 102, and the covering 122 may be made of a single material (e.g. metal) to provide greater durability for those one or more components, while other components of the container 100 are formed of composites having two, three, or more layers. Use of composites may provide one or more of greater strength, reduced cost, and reduced weight.

Figure 6:
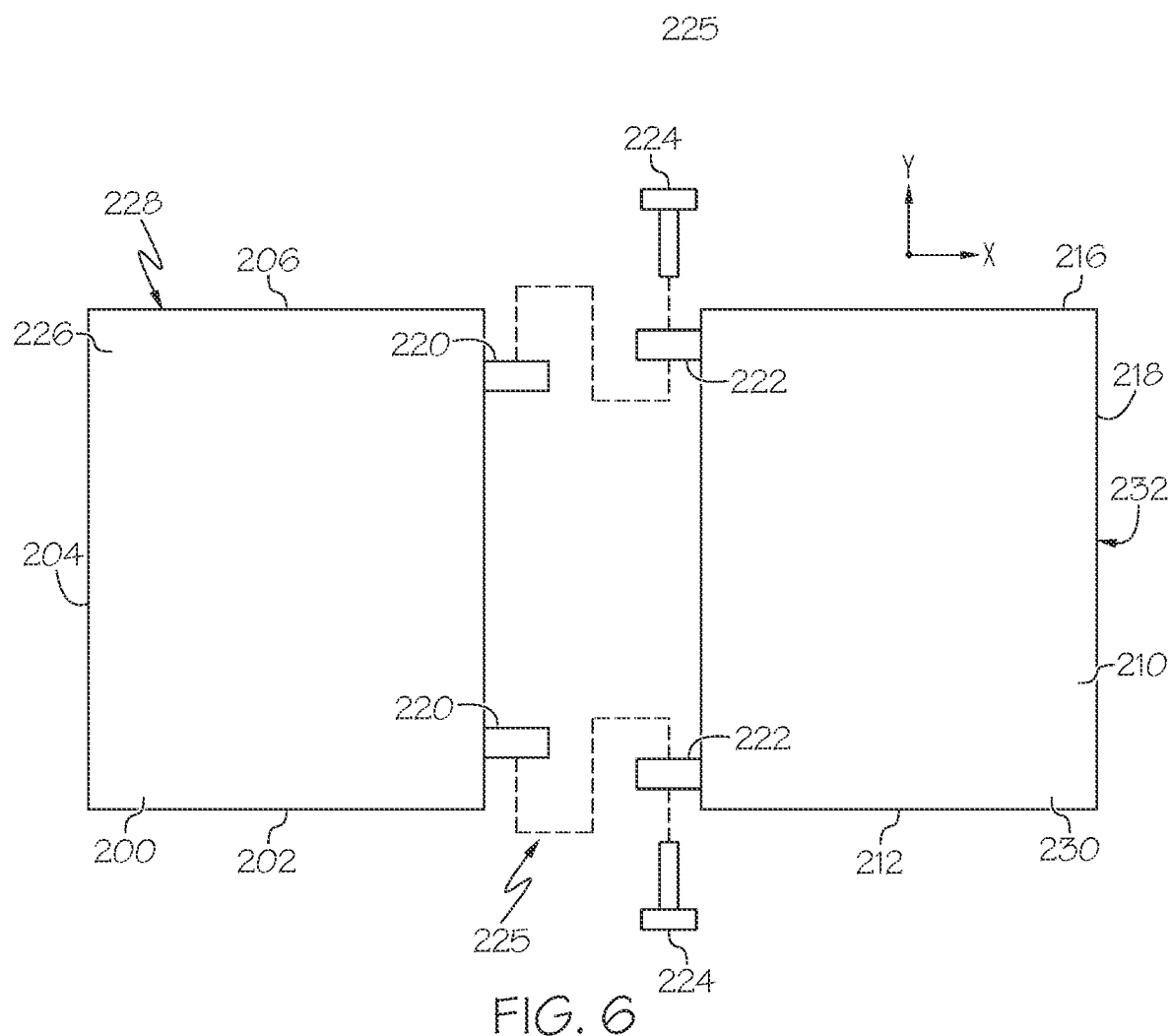
FIG. 6 is a plan view of components for a radio frequency signal isolating container, in accordance with some embodiments.

FIG. 6 is a plan view of components for a radio frequency signal isolating container, in accordance with some embodiments. FIG. 6 includes: a first panel 200 having a first side 202, a second side 204, a third side 206, a fourth side 208, a first face 226, a second face 228, and a pair of first knuckles 220; a second panel 210 having a first side 212, a second side 214, a third side 216, a fourth side 218, a first face 230, a second face 232, and a pair of second knuckles 222; and a pair of pins 224.

As shown, the first panel 200 includes a pair of first knuckles 220 and the second panel 210 includes a pair of second knuckles 222. In various embodiments, the first panel 200 may include one or more first knuckles 220 that are attached to one or more of the first side 202, the second side 204, the third side 206, the fourth side 208, the first face 226, and the second face 228. In various embodiments, the second panel 210 may include one or more second knuckles 222 that are attached to one or more of the first side 212, the second side 214, the third side 216, the fourth side 218, the first face 230, and the second face 232.

The first knuckles 220 and/or the second knuckles 222 may each extend away from their respective mounting position, and may each be formed with an opening configured to receive a pin. Each first knuckle 220 may be configured and positioned to mate with a corresponding second knuckle 222 on a different panel (e.g., a second panel 210), and each second knuckle 220 may be configured and positioned to mate with a corresponding first knuckle 222 on a different panel (e.g., a first panel 200). In FIG. 6, the first knuckles 220 extend along the X-axis direction from the first panel 200 toward the second panel 210. The second knuckles 222 extend along the X-axis direction from the second panel 210 toward the first panel 200.

In various embodiments, the first panel 200 may be used to form one or more of the closed end panel 108, the open end panel 110, the top panel 104, the bottom panel 106, the side panel(s) 102, and the covering 122. The second panel 210 may be used to form one or more of the additional components of the container 100 that may connect with the first panel 200, such as one or more of the closed end panel 108, the open end panel 110, the top panel 104, the bottom panel 106, the side panel(s) 102, and the covering 122. In some embodiments, the first panel 200 and the second panel 210 may be opened or closed using the hinges until they reach a target relative angle to each other. In some embodiments, the angles 114 may be used to secure the first panel 200 and the second panel 210 at the target relative angle. In some embodiments, a target relative angle may be between 85 and 95 degrees, between 80 and 100 degrees, between 70 and 110 degrees, between 20 and 40 degrees, between 40 and 50 degrees, between 170 and 190 degrees, or between 160 and 200 degrees, or between –10 and 10 degrees. The target relative angle may thus be within a range that includes 0, 30, 45, 90, or 180 degrees. 0 degrees relative angle would mean having the first panel 200 and the second panel 210 closed against each other with the first face 226 and the first face 230 being parallel and contacting each other. 30 degrees relative angle would mean that the angle defined by the partially opened first panel 200 and second panel 210 would be 30 degrees, and 90 degrees relative angle would mean that the first panel 200 and the second panel 210 were pivoted open to be perpendicular to each other. 180 degrees relative angle would mean that the first panel 200 and the second panel 210 are pivoted open until they are flat next to each other with the first face 226 being parallel to and in the same plane as the first face 230.

In various embodiments, the first panel 200 and the second panel 210 may be coupled together with a hinged connection, such as by using the first knuckles 220, the second knuckles 222, and the pins 224. The hinged connection between the first panel 200 and the second panel 210 may permit the first panel 200 and the second panel to be folded closed and flat for packaging and shipping, unfolded for assembly, and/or re-folded for re-packing. In various embodiments, the pivot point defined by the first knuckles in FIG. 6 in the Z-axis direction (e.g., an axis perpendicular to both the X and Y-axis directions) may be configured to be at an appropriate depth to permit the first panel 200 and the second panel 210 to be pivoted closed with a 0 degree relative angle, opened to 90 degrees relative angle, or opened to 180 degrees relative angle.

Figure 7A:
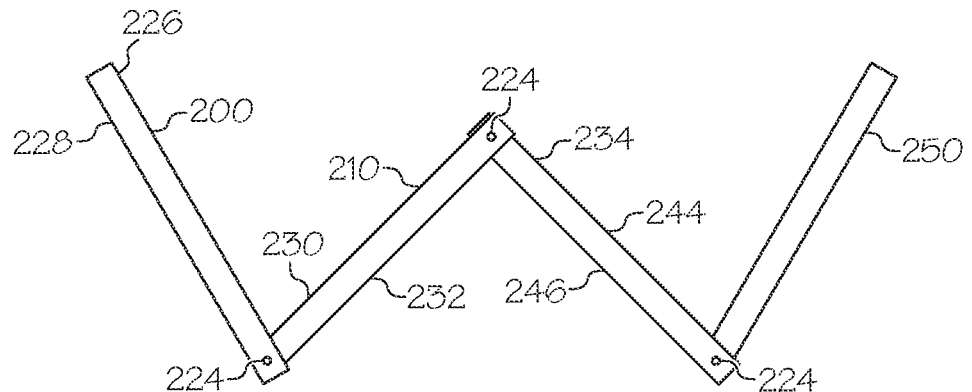
FIGS. 7A and 7B are side views of components for a radio frequency signal isolating container, in accordance with some embodiments.
Figure 7B:
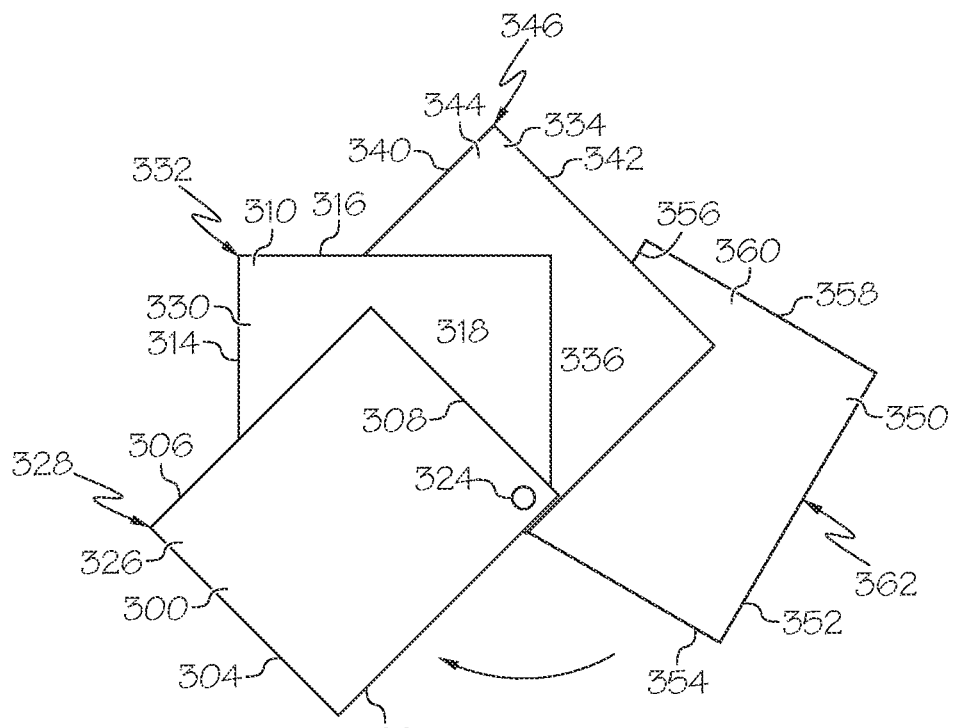
Figure 8A:
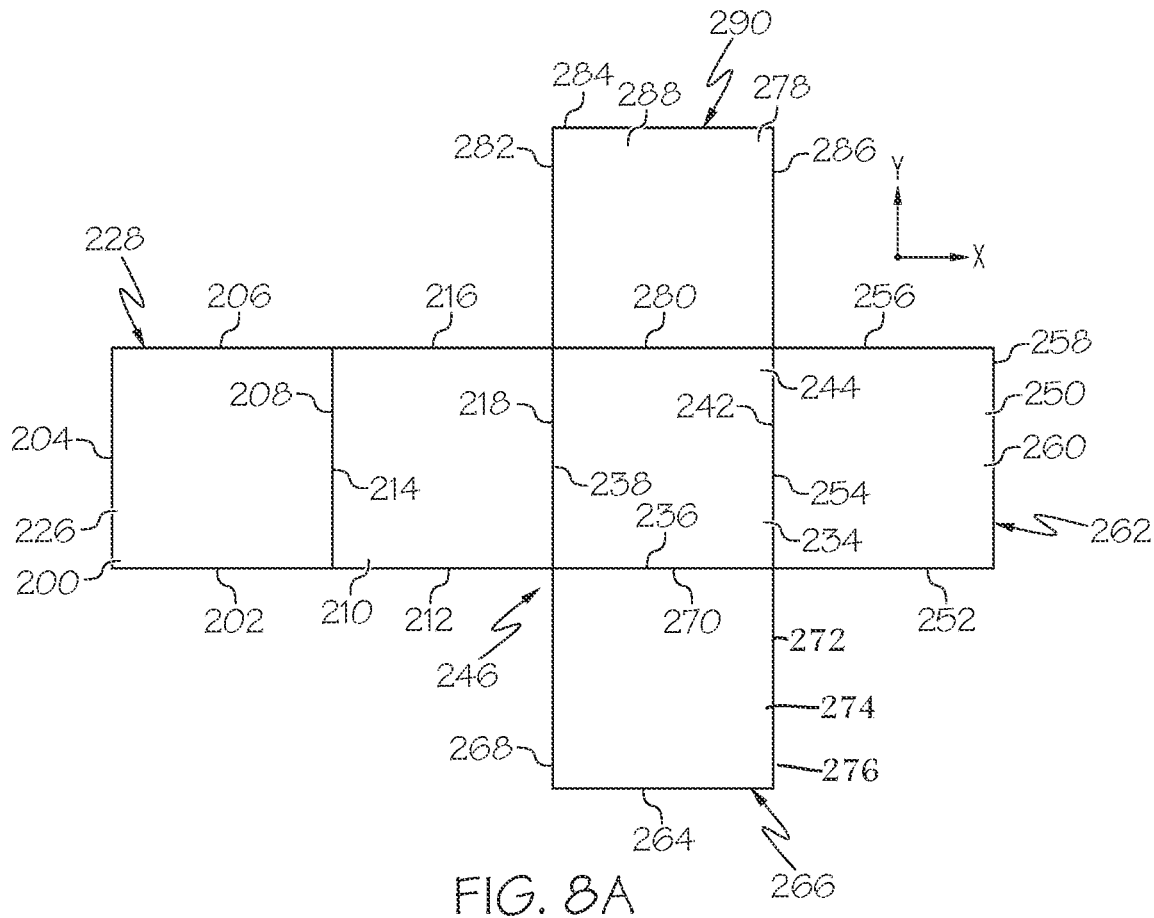
FIGS. 8A-8D are plan views of configurations of components for a radio frequency signal isolating container, in accordance with some embodiments.
Figure 8B:
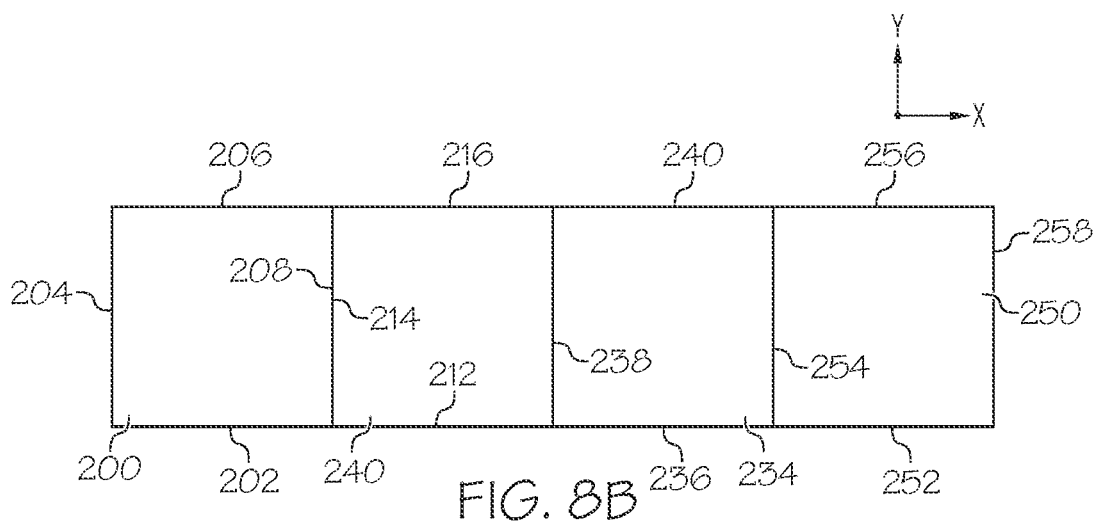
Figure 8C:
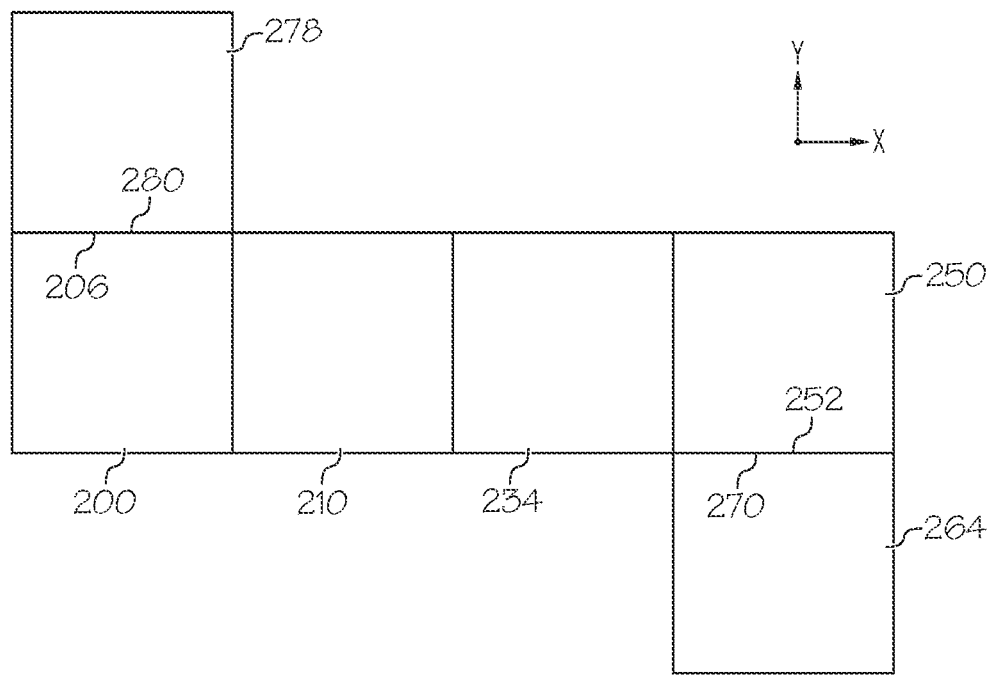
Figure 8D:
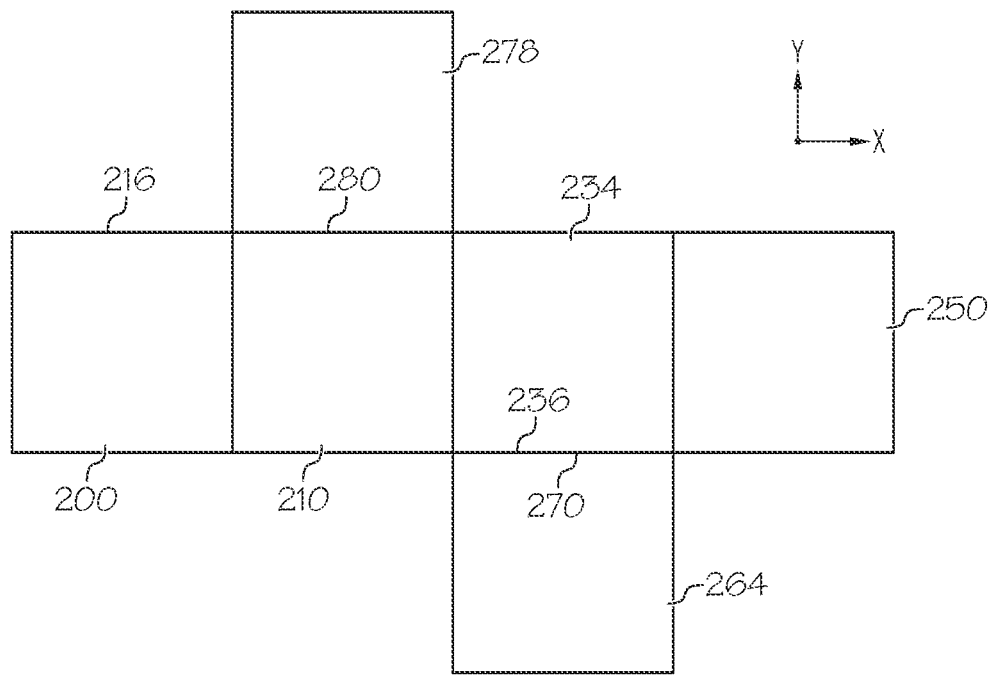

FIGS. 7A and 7B are side views of components for a radio frequency signal isolating container, in accordance with some embodiments. In some embodiments, such as in FIG. 7A, a system may include a first panel 200 having a first side 202, a second side 204, a third side 206, a fourth side 208, a first face 226, a second face 228; a second panel 210 having a first side 212, a second side 214, a third side 216, a fourth side 218, a first face 230, a second face 232; a third panel 234 having a first side 236, a second side 238, a third side 240, a fourth side 242, a first face 244, a second face 246; a fourth panel 250 having a first side 252, a second side 254, a third side 256, a fourth side 258, a first face 260, a second face 262; and multiple pins 224.

FIG. 7A includes a representation of how multiple panels may be fan folded to reduce an amount of space occupied by the panels. In some embodiments, the pivot point may be configured to allow the panels to be fully closed against each other with 0 degrees relative angle. Various embodiments may include a quantity of panels connected by hinges, with the number of panels being 2, 3, 4, 5, 6, 7, 8, or greater.

In some embodiments, one or more of the first panel 200, the second panel 210, the third panel 234, and the fourth panel 250 may be opened or closed until they reach a target relative angle to each other. In some embodiments, a target relative angle may be between 85 and 95 degrees, between 80 and 100 degrees, between 70 and 110 degrees, between 20 and 40 degrees, between 40 and 50 degrees, between 170 and 190 degrees, or between 160 and 200 degrees, or between –10 and 10 degrees. The target relative angle may thus be within a range that includes 0, 30, 45, 90, or 180 degrees.

In some embodiments, each of the first panel 200, the second panel 210, the third panel 234, and the fourth panel 250 may form one of the closed end panel 108, the open end panel 110, the top panel 104, the bottom panel 106, the side panel(s) 102, and the covering 122. In some embodiments, a combination of one or more of the first panel 200, the second panel 210, the third panel 234, and the fourth panel 250 may be opened to form part or all of at least one of the closed end panel 108, the open end panel 110, the top panel 104, the bottom panel 106, the side panel(s) 102, and the covering 122.

In some embodiments, such as in FIG. 7B, two or more panels may be pivotably connected at a pivot point. The system may include a first panel 300 having a first side 302, a second side 304, a third side 306, a fourth side 308, a first face 326, a second face 328; a second panel 310 having a first side 312, a second side 314, a third side 316, a fourth side 318, a first face 330, a second face 332; a third panel 334 having a first side 336, a second side 338, a third side 340, a fourth side 342, a first face 344, a second face 346; a fourth panel 350 having a first side 352, a second side 354, a third side 356, a fourth side 358, a first face 360, a second face 362; and at least one pin 324 or pivot device. In some embodiments, fewer or additional panels are connected to each other.

In some embodiments, one or more of the first panel 300, the second panel 310, the third panel 334, and the fourth panel 350 may be positioned to be aligned with one or more other panels, or rotated to various angles relative to each other. The multiple panels may aligned with each other to conserve space and may be opened to cover a relatively larger space, such as to form a panel for reflecting and/or blocking RF signals. In some embodiments, one or more sets of the first panel 300, the second panel 310, the third panel 334, and the fourth panel 350 may be opened to form one or more of the closed end panel 108, the open end panel 110, the top panel 104, the bottom panel 106, the side panel(s) 102, and the covering 122.

FIGS. 8A-8D are plan views of configurations of components for a radio frequency signal isolating container, in accordance with some embodiments. In some embodiments, such as in FIGS. 8A-8D, a system may include a first panel 200 having a first side 202, a second side 204, a third side 206, a fourth side 208, a first face 226, a second face 228; a second panel 210 having a first side 212, a second side 214, a third side 216, a fourth side 218, a first face 230, a second face 232; a third panel 234 having a first side 236, a second side 238, a third side 240, a fourth side 242, a first face 244, a second face 246; a fourth panel 250 having a first side 252, a second side 254, a third side 256, a fourth side 258, a first face 260, a second face 262; a fifth panel 264 having a first side 266, a second side 268, a third side 270, a fourth side 272, a first face 274, a second face 276; a sixth panel 278 having a first side 280, a second side 282, a third side 284, a fourth side 286, a first face 288, a second face 290.

In various embodiments, the first panel 200, the second panel 210, the third panel 234, the fourth panel 250, the fifth panel 264, and the sixth panel 278 may be connected using hinges, such as to facilitate flat packing for shipment, faster and easier assembly, and/or faster repacking. In some embodiments, each of the first panel 200, the second panel 210, the third panel 234, the fourth panel 250, the fifth panel 264, and the sixth panel 278 may form one of the closed end panel 108, the open end panel 110, the top panel 104, the bottom panel 106, the side panel(s) 102, and the covering 122. In some embodiments, one or more of the first panel 200, the second panel 210, the third panel 234, the fourth panel 250, the fifth panel 264, and the sixth panel 278 may be used to form part or all of at least one of the closed end panel 108, the open end panel 110, the top panel 104, the bottom panel 106, the side panel(s) 102, and the covering 122.

In some embodiments, such as in FIGS. 8A-8D, the first panel 200, the second panel 210, the third panel 234, and the fourth panel 250 may be connected in the manner described with respect to FIG. 7A. In various embodiments, the third side 270 of the fifth panel 264 may be connected to the first side 236 of the third panel 234, the first side 252 of the fourth panel 250, the first side 202 of the first panel 200, the first side 212 of the second panel 210, or any other side of one of the other panels that permits forming the container 100 or a part or all of another component of the container 100. In various embodiments, the first side 280 of the sixth panel 278 may be connected to the third side 206 of the first panel 200, the third side 216 of the second panel 210, the third side 240 of the third panel 234, the third side 256 of the fourth panel 250, or any other side of one of the other panels that permits forming the container 100 or a part or all of another component of the container 100.

Figure 9:
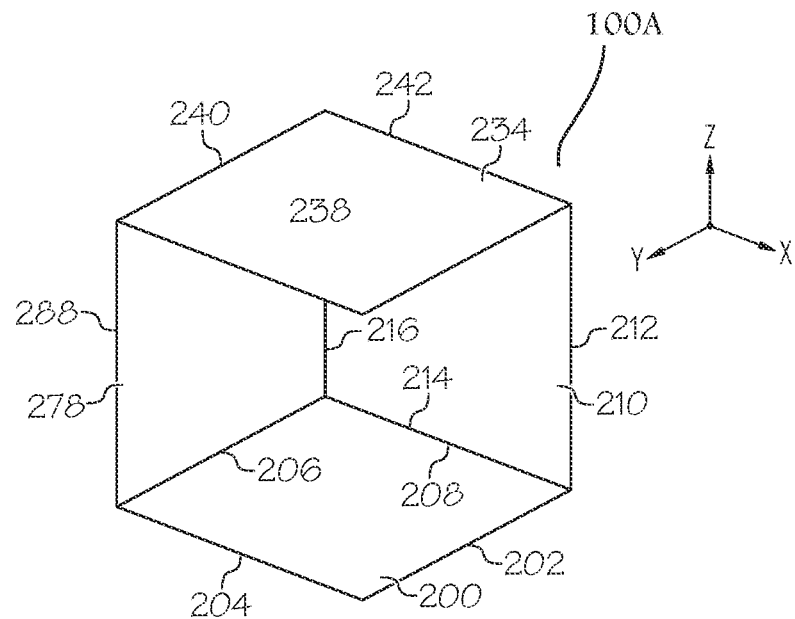
FIG. 9 is a perspective view of a radio frequency signal isolating container, in accordance with some embodiments.

FIG. 9 is a perspective view of a radio frequency signal isolating container, in accordance with some embodiments. In some embodiments, such as in FIG. 9, a system may include a first panel 200 having a first side 202, a second side 204, a third side 206, a fourth side 208, a first face 226, a second face 228; a second panel 210 having a first side 212, a second side 214, a third side 216, a fourth side 218, a first face 230, a second face 232; a third panel 234 having a first side 236, a second side 238, a third side 240, a fourth side 242, a first face 244, a second face 246; a sixth panel 278 having a first side 280, a second side 282, a third side 284, a fourth side 286, a first face 288, a second face 290.

In some embodiments, two adjacent faces of a container 100A may be open and coverable using a door or curtain. As shown in FIG. 9, four of the covered faces of the container 100A may be formed using the first panel 200, the second panel 210, the third panel 234, and the sixth panel 278, such as by unfolding the panels from a flat pack configuration. In some embodiments, one or more of the first panel 200, the second panel 210, the third panel 234, and the sixth panel 278 may be removable and reattachable rather than being configured to fold flat for shipment.

By opening allowing access to the container 100A through two adjoining faces, some embodiments may allow more efficient methods and systems for adding packages to the container 100A for scanning and removing them through a separate exit route to permit more rapid addition of additional packages. For example, by using two separate routes for adding and removing packages, the container 100A may allow a delivery line of persons and/or packages to be formed at one side and a removal line of persons and/or packages to be formed at a removal side of the container 100A. By allowing access through two adjacent faces of the container 100A, the system may allow for more efficient operations even in confined areas where room may be insufficient for access to two opposing sides of a container 100A.

Figure 10:
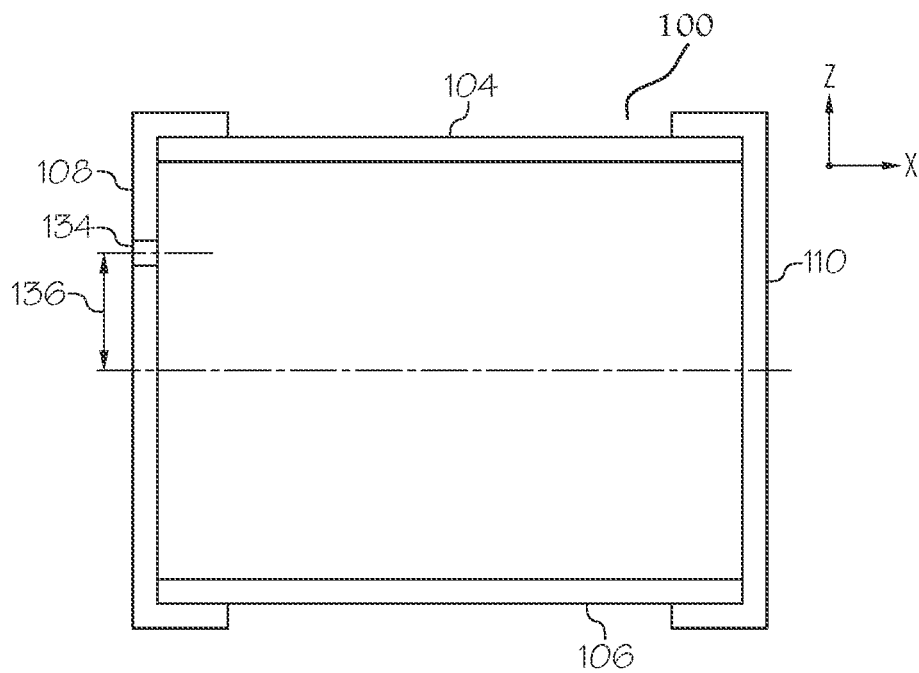
FIG. 10 is a cross-sectional view of a radio frequency signal isolating container, in accordance with some embodiments.

FIG. 10 is a cross-sectional view of a radio frequency signal isolating container, in accordance with some embodiments. In some embodiments, the closed end cap 108 includes an opening 134 disposed at a distance 136 measured along the Z-axis from a midline of the container 100. The opening 134 may be used for signal and/or power cabling, such as for the antenna 128. In various embodiments, the distance 136 permits mounting of the antenna at an off-center location on the closed end cap 108, which may permit the antenna to be placed at different positions for improved reads of RFID tags or other transponders placed within the container 100. For example, if the antenna 128 is mounted to the closed end cap 108 at or near the location of the opening 134, then rotation of the closed end cap 108 around the X-axis may move the antenna 128 relative to the other components to a higher, lower, or laterally disposed location relative to a midline of the container 100.

Figure 11:
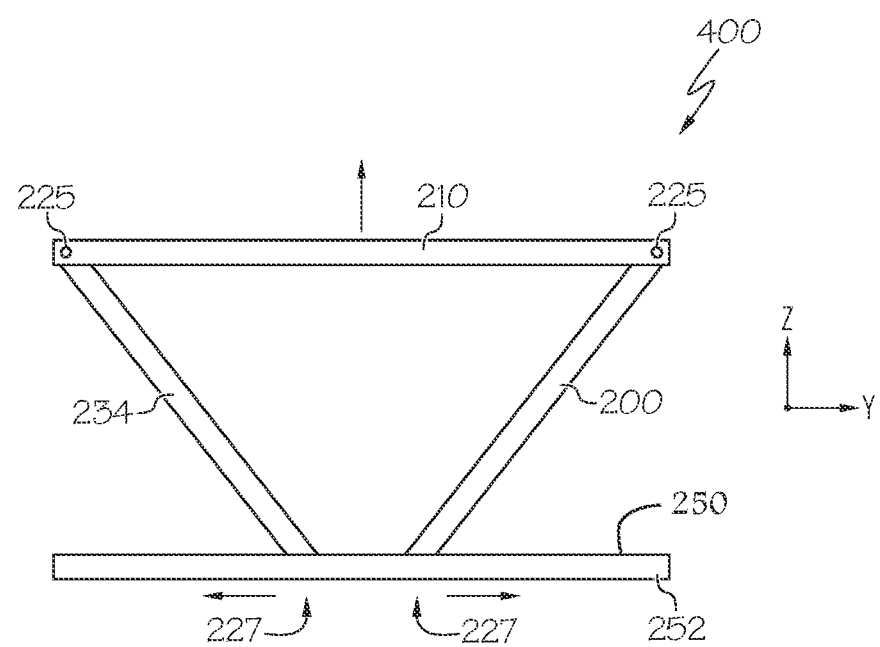
FIG. 11 is an elevation view of components for a radio frequency signal isolating container, in accordance with some embodiments.

FIG. 11 is an elevation view of components for a radio frequency signal isolating container, in accordance with some embodiments. In some embodiments, a container 400 may include a first panel 200, a second panel 210, a third panel 234, and a fourth panel 250 having a first face 252. The first panel 200 and the third panel 234 may be pivotably connected to opposite sides of the second panel 210 at pivot locations 225. The first panel 200 and the third panel 234 may be slidably connected to the fourth panel 250 at sliding locations 227. In various embodiments, container 400 may be collapsed to a flat pack configuration when the second panel 210 is lowered towards the fourth panel 250. In the flat pack configuration, the second panel 210 may rest against one or both of the first panel 200 and/or the third panel 234, and one or both of the first panel 200 and the third panel 234 may rest on the fourth panel 250.

As the second panel 210 is raised or otherwise separated from the fourth panel 250, the first panel 200 and the third panel 234 each rotate outwards to increase a relative respective angle with the second panel 210. At the same time, as the first panel 200 and the third panel 234 rotate, the slidably connected locations 227 of the first panel 200 and the third panel 234 may move slidingly outwards away from each other to form four walls of the container 400. In some embodiments, additional walls, panels, or curtains may be added to close the container 400 for radio frequency (RF) signal containment purposes purposes.

Figure 12A:
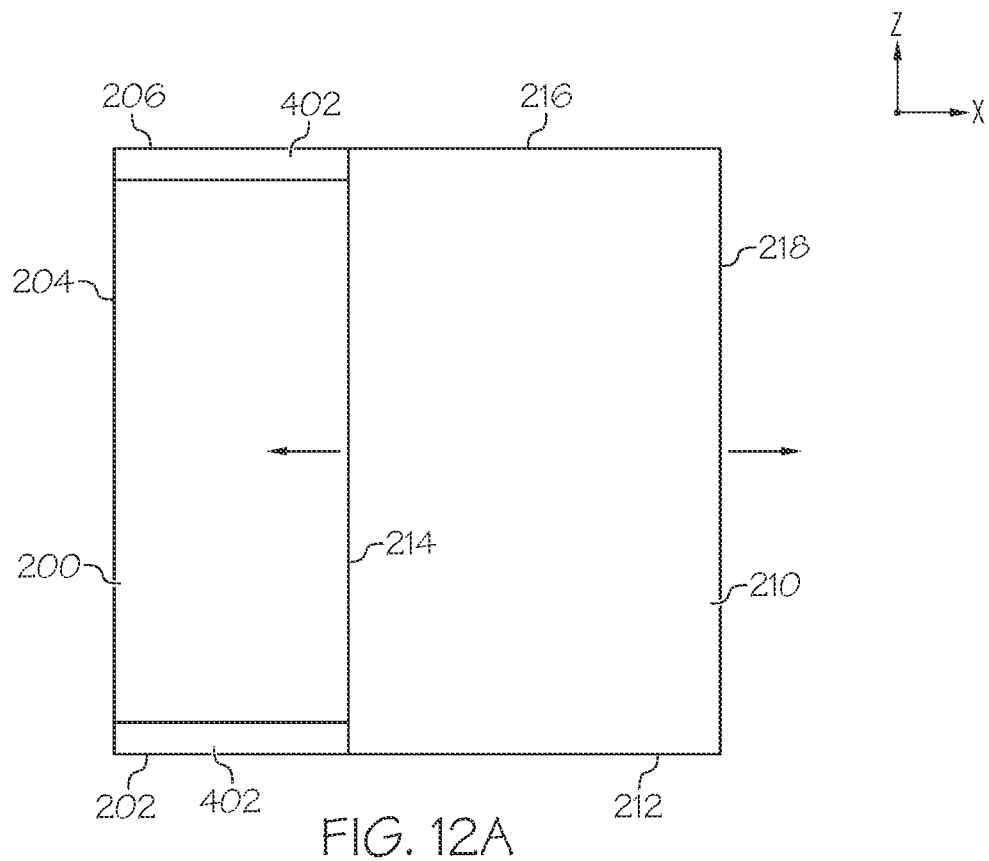
FIGS. 12A and 12B are a plan view and an enlarged partial perspective view of components for a radio frequency signal isolating container, in accordance with some embodiments.
Figure 12B:
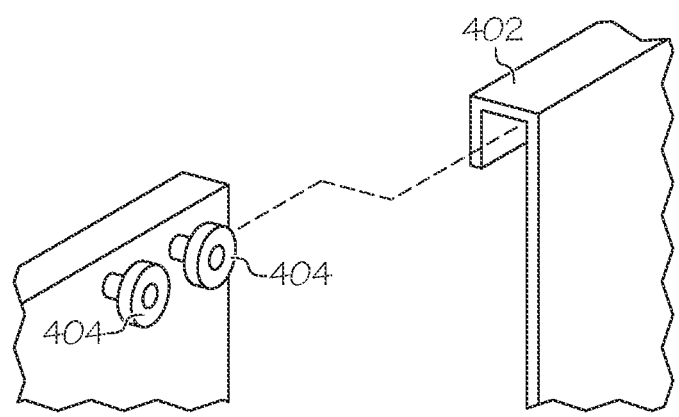

FIGS. 12A and 12B are a plan view and an enlarged partial perspective view of components for a radio frequency signal isolating container, in accordance with some embodiments. In various embodiments, the first panel 200 and the second panel 210 may be slidably connected to each other. In various embodiments, additional panels may also be slidably connected to one or more of the first panel 200, the second panel 210, and other additional panels. The sliding connection systems described with respect to the first panel 200 and the second panel 210 may also apply to any of the other components described here that may be slidably connected.

In various embodiments one of the first panel 200 and the second panel 210 may include one or more wheels 404, and the other of the first panel 200 and the second panel 210 may include the corresponding rail 402 for the one or more wheels 404. In some embodiments, the first panel 200, the second panel 210, and potentially other panels may be slidably connected to each other. In some embodiments, a combination of one or more of the first panel 200, the second panel 210, and any other slidably or otherwise connected or connectable panels may be opened to form part or all of at least one of the closed end panel 108, the open end panel 110, the top panel 104, the bottom panel 106, the side panel(s) 102, and the covering 122.

Figure 13A:
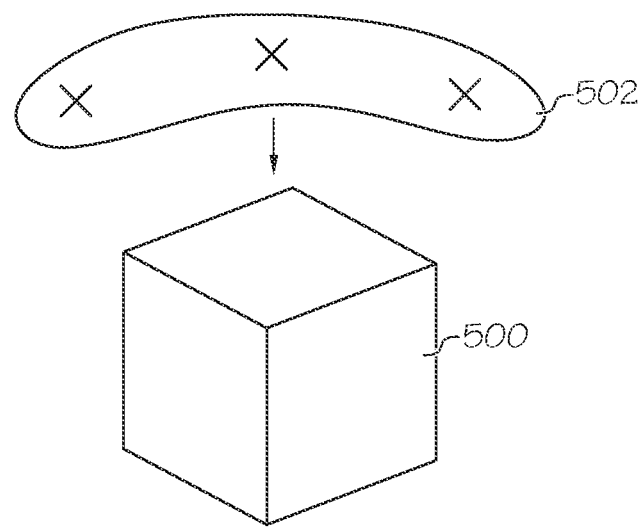
FIGS. 13A-13C are illustrations of a method of forming components for a radio frequency signal isolating container, in accordance with some embodiments.
Figure 13B:
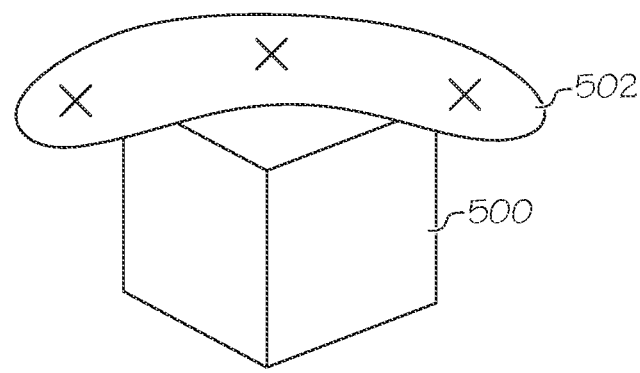
Figure 13C:
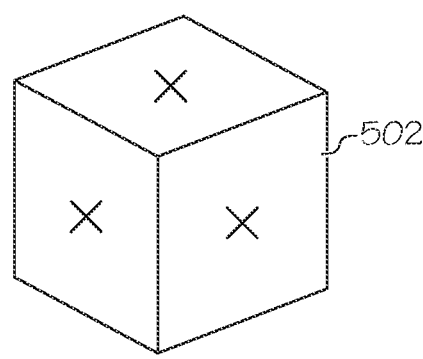

FIGS. 13A-13C are illustrations of a method of forming components for a radio frequency signal isolating container, in accordance with some embodiments. In some embodiments, a container 500 may lack RF signal reflecting material. A wrap 502, which may be and/or include a metallized plastic film, may be placed over the container 502 as shown in FIGS. 13A-13C, adhered to the surface of the container 502. In some embodiments that include a kit, the metallized film may be included with the kit along with the flat pack components for the container 500.

In various embodiments, using the components, systems, and methods described here, container 100, 100A, 400, and/or 500 may provide an advantageous simple, low-cost, and/or easily transportable solution for isolating quantities of RFID-tagged items for scanning. These advantages of container 100 allow customers, such as source factories, which may be located in diverse regions of the world to more easily implement auditing procedures utilizing RFID, while keeping equipment expenditures low and scanning accuracy high.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

The terms "one or more of a, b, and c", "at least one of a, b, and c", and "at least one of a, b, or c" are intended to refer to a, b, c, or combinations thereof including 1) one or multiple of a and one or multiple of b, 2) one or multiple of b and one or multiple of c, 3) one or multiple of a and one or multiple of c, 4) one or multiple of a, 5) one or multiple of b, or 6) one or multiple of c.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The foregoing description and accompanying figures illustrate some of the principles, preferred embodiments and modes of operation of the invention. However, the invention should not be construed as being limited to the particular embodiments discussed above. Accordingly, it should be appreciated that variations to those embodiments can be made by those skilled in the art without departing from the scope of the invention as defined by the following claims.

What is claimed is:

1. A kit for forming a radio frequency container, the kit comprising:
    a top panel,
    a bottom panel having a raised support,
    at least one side panel configured to connect the top panel and the bottom panel,
    an RF antenna configured for attachment to an interior surface of the container;
    wherein the top panel, the bottom panel, and the at least one side panel are configured to reflect and contain RF signals within the radio frequency container, and
    wherein the bottom panel is formed with an internal support that RF signals can pass through.

2. The kit of claim 1, further comprising:
    a closed end panel;
    an open end panel that defines an opening; and
    a covering configured to close the opening and to block RF signals.

3. The kit of claim 1, wherein the antenna is adapted to interact with an RFID reader external to the container and to emit an RF signal within the interior cavity of the container.

4. The kit of claim 1, wherein the container is sized to receive a plurality of RFID-tagged items within the interior cavity.

5. The kit of claim 4, wherein the plurality of RFID-tagged items is densely packed within a carton.

6. The kit of claim 1, further comprising four angles for coupling the top panel and bottom panel to a pair of side panels.

7. The kit of claim 2, wherein the covering is formed from an RF-blocking fabric.

8. The kit of claim 2, wherein the covering is formed from a polymer sheet impregnated with RF-blocking substances.

9. The kit of claim 1, wherein each of the top panel, the bottom panel, and the at least one side panels are formed from a wood fiber product conducive to propagation of RF signals.

10. The kit of claim 1, wherein the kit is adapted to be transported as a flat pack.

11. The kit of claim 1, further comprising four angles for coupling the panels.

12. A method of forming a kit for forming a radio frequency container, the method comprising:
    providing a top panel,
    providing a bottom panel having a raised support,
    providing at least one side panel configured to connect the top panel and the bottom panel,
    providing an RF antenna configured for attachment to an interior surface of the container;
    wherein the top panel, the bottom panel, and the at least one side panel are configured to reflect and contain RF signals within the radio frequency container, and
    wherein the bottom panel is formed with an internal support that RF signals can pass through.

13. The method of claim 12, further comprising:
    providing a closed end panel;
    providing an open end panel that defines an opening; and
    providing a covering configured to close the opening and to block RF signals.

14. The method of claim 12, wherein the antenna is adapted to interact with an RFID reader external to the container and to emit an RF signal within the interior cavity of the container.

15. The method of claim 12, wherein the container is sized to receive a plurality of RFID-tagged items within the interior cavity.

16. The method of claim 15, wherein the plurality of RFID-tagged items are densely packed within a carton.

\* \* \* \* \*